United States Patent
Mekid

(10) Patent No.: US 8,608,398 B2
(45) Date of Patent: Dec. 17, 2013

(54) SPHERICAL JOINT WITH INTERNAL BRAKE

(75) Inventor: Samir Mekid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 236 days.

(21) Appl. No.: 13/308,460

(22) Filed: Nov. 30, 2011

(65) Prior Publication Data

US 2012/0076570 A1    Mar. 29, 2012

Related U.S. Application Data

(63) Continuation-in-part of application No. 12/457,382, filed on Jun. 9, 2009, now abandoned.

(51) Int. Cl.
*F16C 11/06* (2006.01)

(52) U.S. Cl.
USPC .............. 403/90; 403/128; 403/123; 403/316

(58) Field of Classification Search
USPC .......... 403/90, 122, 123, 128, 145, 148, 131, 403/322.3, 316; 188/19, 20, 74, 78; 464/110; 901/28, 29, 49; 248/288.51, 248/398, 481, 550
See application file for complete search history.

(56) References Cited

U.S. PATENT DOCUMENTS

| 2,470,693 | A | 5/1949 | Finke et al. |
| 3,059,948 | A | 10/1962 | Thompson et al. |
| 3,958,904 | A | 5/1976 | Rusbach |
| 4,043,686 | A | 8/1977 | Hackett |
| 4,739,241 | A | 4/1988 | Vachtsevanos et al. |
| 5,544,968 | A | 8/1996 | Goellner |
| 6,154,686 | A | 11/2000 | Hefferen et al. |
| 6,217,249 | B1 | 4/2001 | Merlo |
| 6,641,323 | B2 | 11/2003 | Ronsheim |
| 6,672,788 | B2 | 1/2004 | Hathaway |
| 6,767,153 | B1 | 7/2004 | Holbrook |
| 2003/0138288 | A1 | 7/2003 | Ronsheim |

FOREIGN PATENT DOCUMENTS

DE    3603981 (A1)    7/1986

*Primary Examiner* — Victor MacArthur
*Assistant Examiner* — Jonathan Masinick
(74) *Attorney, Agent, or Firm* — Richard C. Litman

(57) ABSTRACT

The spherical joint with internal brake has a controlled actuator that selectively brakes relative motion between interior members and an outer shell of the spherical ball joint. A shaft extending from the internal members can be stopped at any rotational position relative to the shell. The internal members may include a central spherical sectioned member sandwiched by a pair of symmetrically opposed peripheral spherical sectioned members, which selectively act as brakes when an actuator in the central member is energized. The energized actuator has a dual piston that pushes outwardly on the pair of opposed peripheral segments, which increases friction between the peripheral segments and an interior wall of the spherical shell to brake the system. The shaft extends from the central spherical sectioned member through an aperture in the shell. The size of the shell aperture determines the range of rotational motion of the shaft.

20 Claims, 5 Drawing Sheets

SPHERICAL JOINT WITH INTERNAL BRAKE

CROSS-REFERENCE TO RELATED APPLICATION

This application is a continuation-in-part of U.S. patent application Ser. No. 12/457,382, filed on Jun. 9, 2009.

BACKGROUND OF THE INVENTION

1. Field of the Invention

The present invention relates to mechanical couplings, and particularly to a spherical joint having an internal brake.

2. Description of the Related Art

Numerous ball and socket joints having manual joint locking mechanisms exist. Such mechanisms are usually very complex and due to the manual locking are not suitable for robotic or parallel kinematic machine operations. Even lockable joint devices linked to hydraulic systems may not be suitable for robotic applications, or the like. Moreover, ball joints with detent stopping action do not lock to an arbitrarily desired position, and therefore are not precise enough for robotic machine applications. It would be very desirable to overcome the aforementioned problems caused by the use of existing ball joint mechanisms.

Thus, a spherical joint with internal brake solving the aforementioned problems is desired.

SUMMARY OF THE INVENTION

The spherical joint with internal brake has a controlled internal actuator that selectively brakes relative motion between internal members and an outer shell of the spherical ball joint. A shaft extending from the internal members can be stopped at any rotational position relative to the shell. The internal members include a central spherical sectioned member sandwiched by a pair of symmetrically opposed peripheral spherical sectioned members, which selectively act as brakes when an actuator in the central member is energized. The energized actuator has a dual piston that pushes outwardly on the pair of opposed peripheral segments, which thereby increases friction between the peripheral segments and an interior wall of the spherical shell to brake the system. The shaft extends from the central spherical sectioned member through an aperture in the shell. The size of the shell aperture determines the range of rotational motion of the shaft.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
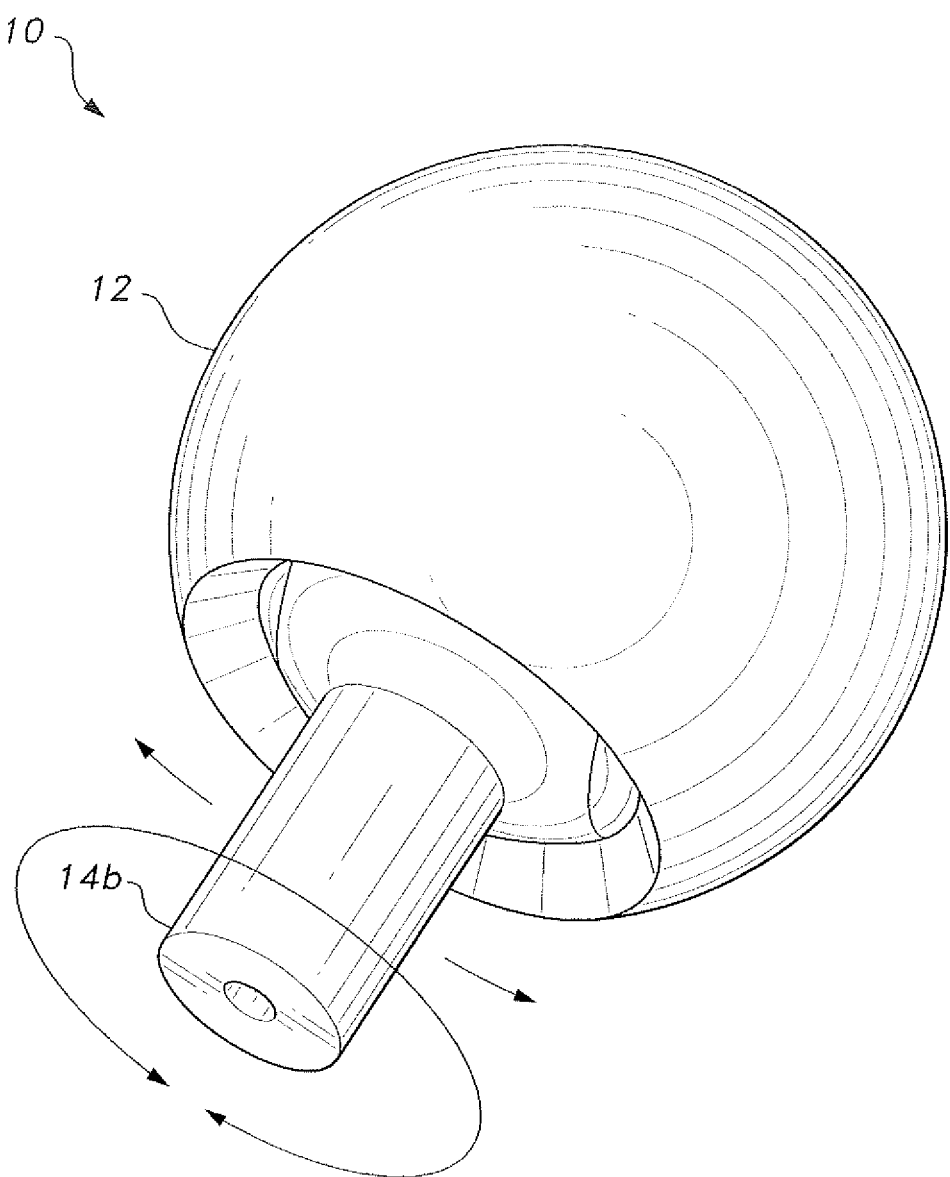
FIG. 1 is a perspective view of a spherical joint with internal brake according to the present invention.
Figure 2:
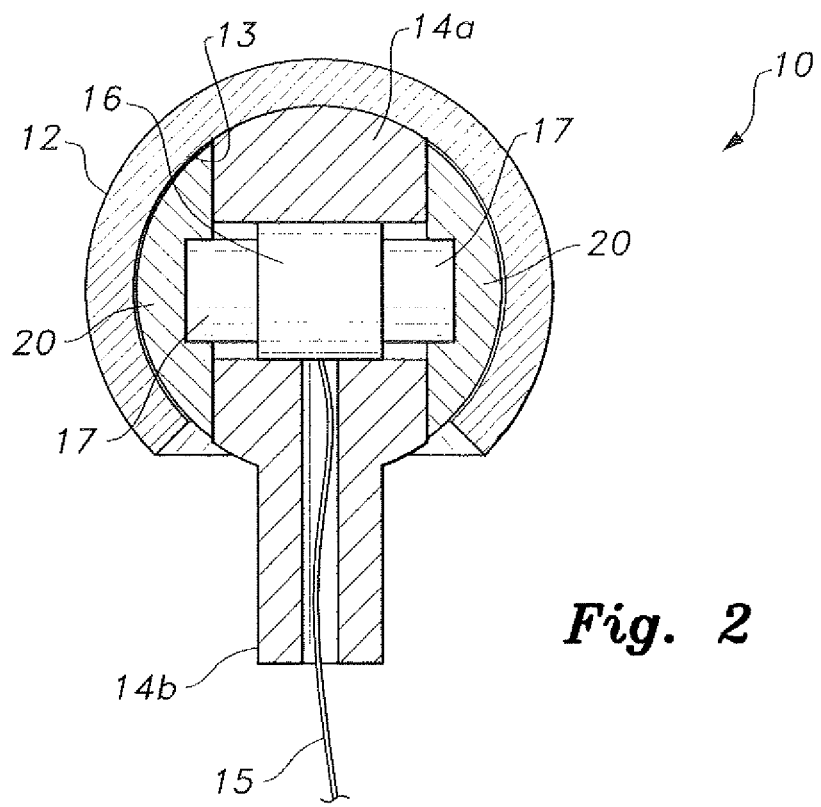
FIG. 2 is a side view in section of a spherical joint with internal brake according to the present invention, showing a first configuration of the joint in a normal position.
Figure 3:
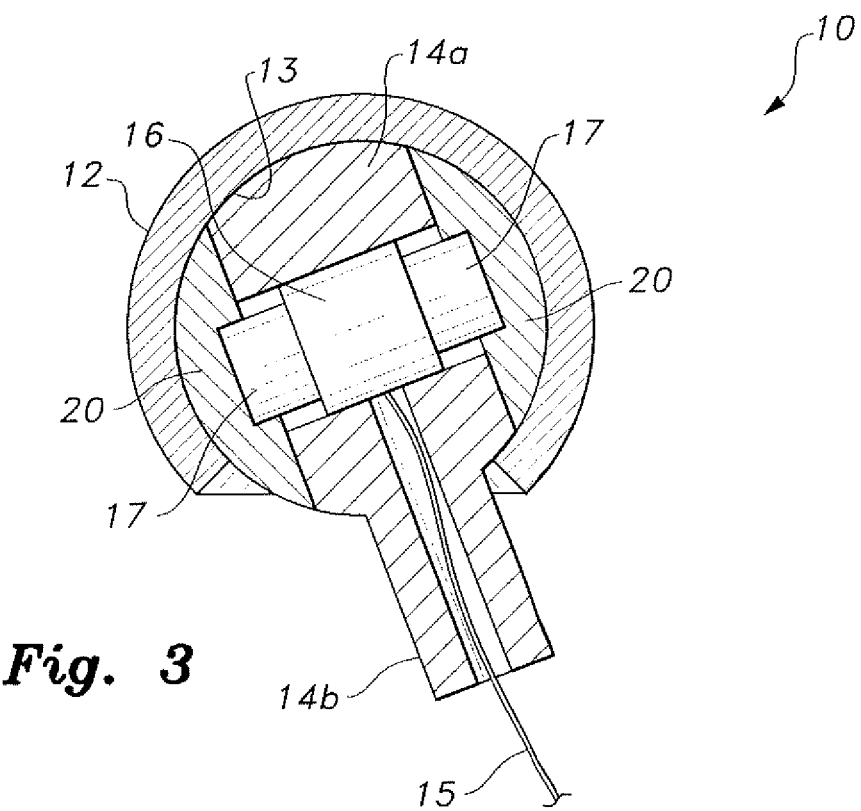
FIG. 3 is a side view in section of the spherical joint with internal brake according to the present invention, showing a second configuration of the joint in an inclined position.

As shown in FIGS. 1-3, the spherical joint with internal brake, designated generally as 10 in the drawings, is a ball joint having a controlled internal actuator 16 that selectively locks a shaft 14b extending from a central spherical sectioned member 14a of the spherical ball joint 10 to any position within an engineered range of rotation. This type of joint finds utility in the field of robotics, parallel kinematic machines, and the like. Moreover, the joint 10 may be utilized in positioning devices, MEMS devices, micro-machines, and optical systems.

The spherical joint 10 is extremely important to unlock and enlarge the workspace and improve the dexterity of robots for many applications. The joint 10 includes the outer retainer shell 12, which can be mounted on a fixed or a movable element. The spherical joint 10 allows relative spherical motion between the outer shell 12 and interior components of the joint 10. The spherical motion is limited by the size of the aperture in the spherical shell 12, the maximum range of motion being achieved when the aperture size is equal to the circumference of the external, spherical shell 12.

The internal portion of the spherical joint 10 includes peripheral spherical sections 20, which sandwich the central spherical section 14a to form an internal sphere inside of the outer spherical shell 12 in close proximity to the internal wall 13 of the outer spherical shell 12. A piezoelectric or electromagnetic actuator 16 having a dual piston 17 is held by the central spherical section 14a. The dual piston 17 has ends that are attached to the peripheral spherical sections 20. It should be understood that any suitable type of actuator may be utilized, such as a pressurized or compressed air-driven actuator.

Responsive to control signals received via a control line 15, the actuator 16 causes outward radial mechanical displacement of the dual piston 17, the mechanical displacement applying an outward radial force that pushes the peripheral sections 20 into frictional contact with the inner wall 13 of the outer spherical shell 12, thereby braking motion of the shaft 14b. Braking and release control commands via control line 15 may be sent by a proportional-integral-derivative (PID) controller, which may be external to the joint 10. Alternatively, the braking and release control signals may originate from a controller internal to and operably connected to the spherical joint 10.

Figure 5:
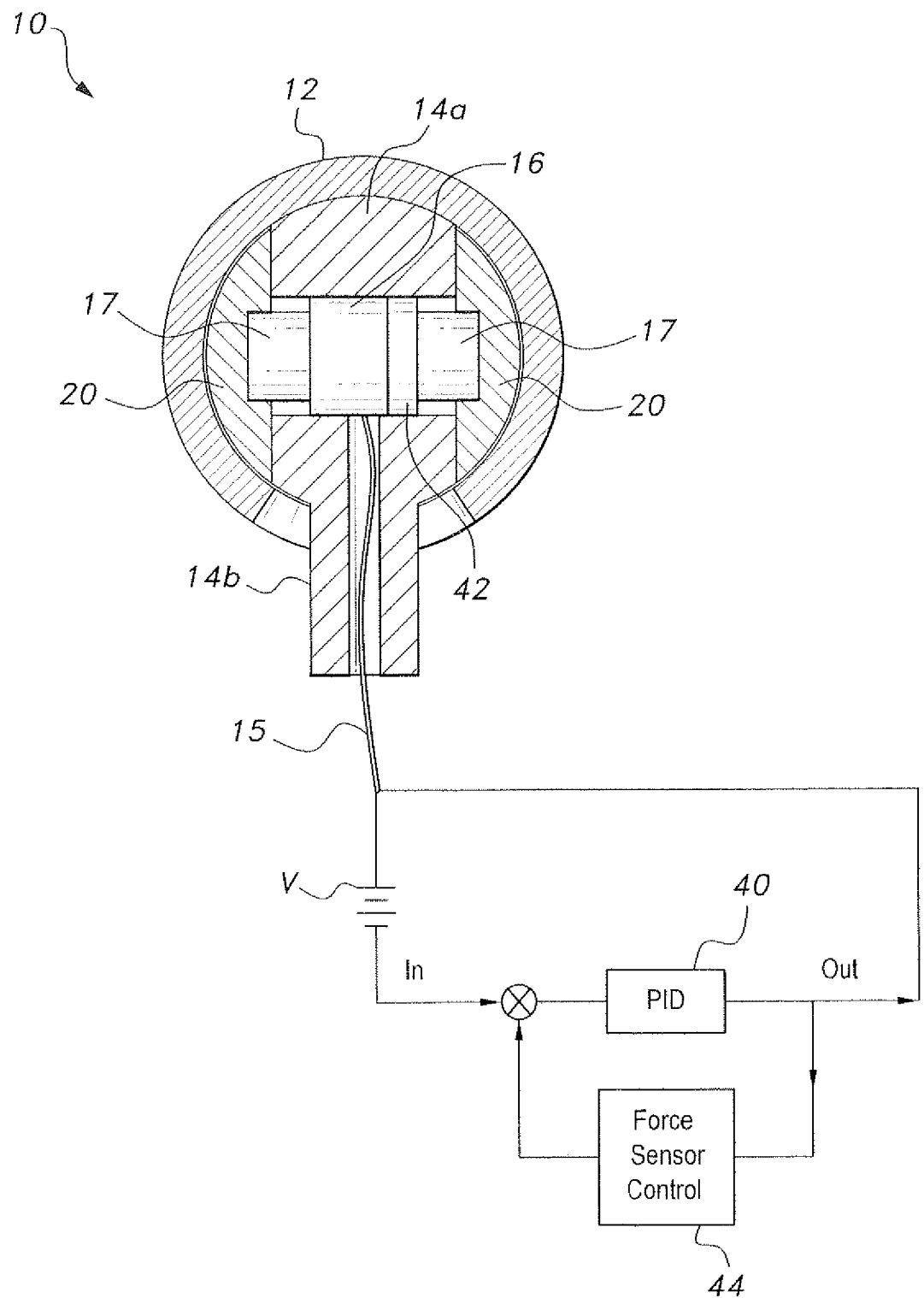
FIG. 5 is a side view in section of another alternative embodiment of a spherical joint with internal brake according to the present invention.
Figure 6:
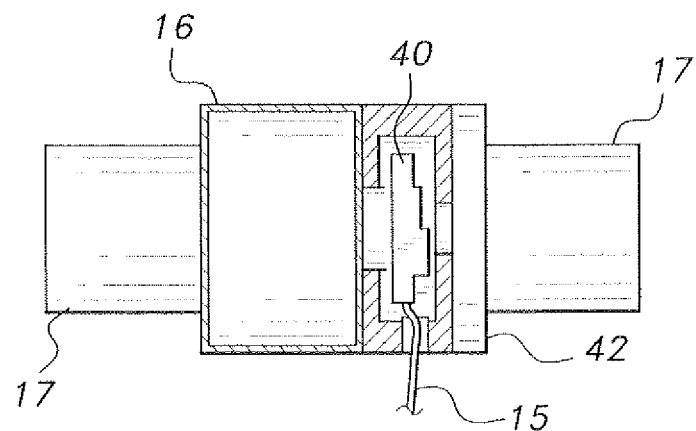
FIG. 6 is a side view in section of an actuator, controller and force sensor arrangement of still another alternative embodiment of a spherical joint with internal brake according to the present invention.

FIG. 5 illustrates an external proportional-integral-derivative (PID) controller 40. As shown in FIG. 5, the piezoelectric or electromagnetic actuator 16 is coupled with a force sensor 42, which may be any suitable type of force sensor, and both the actuator 16 and the force sensor 42 are positioned between the dual pistons 17 held by the central spherical section 14a. Power from an external electrical potential source V and control signals from the PID controller 40 are delivered via control line 15 to the actuator 16. Responsive to feedback delivered by the force sensor 42, a separate force sensor controller 44 may be coupled with PID controller 40. FIG. 6 illustrates an alternative actuator arrangement, where the PID controller 40 is mounted internally, the controller 40 being positioned between and coupled to the actuator 16 and the force sensor 42.

The internal spherical components 14a and 20 have smooth surfaces in full contact with the inner wall of the shell 12, thereby permitting smooth spherical motion and motion locking at any position within the area of possible rotational motion. The spherical motion obtained from the spherical joint 10 has a precision motion quality.

The design principle allows precision spherical motion with controlled braking and locking at any position. The range of motion will be limited by the aperture size of the spherical retainer shell 12, which preferably is equal to or less than the circumference of the spherical retainer shell 12.

Figure 4A:
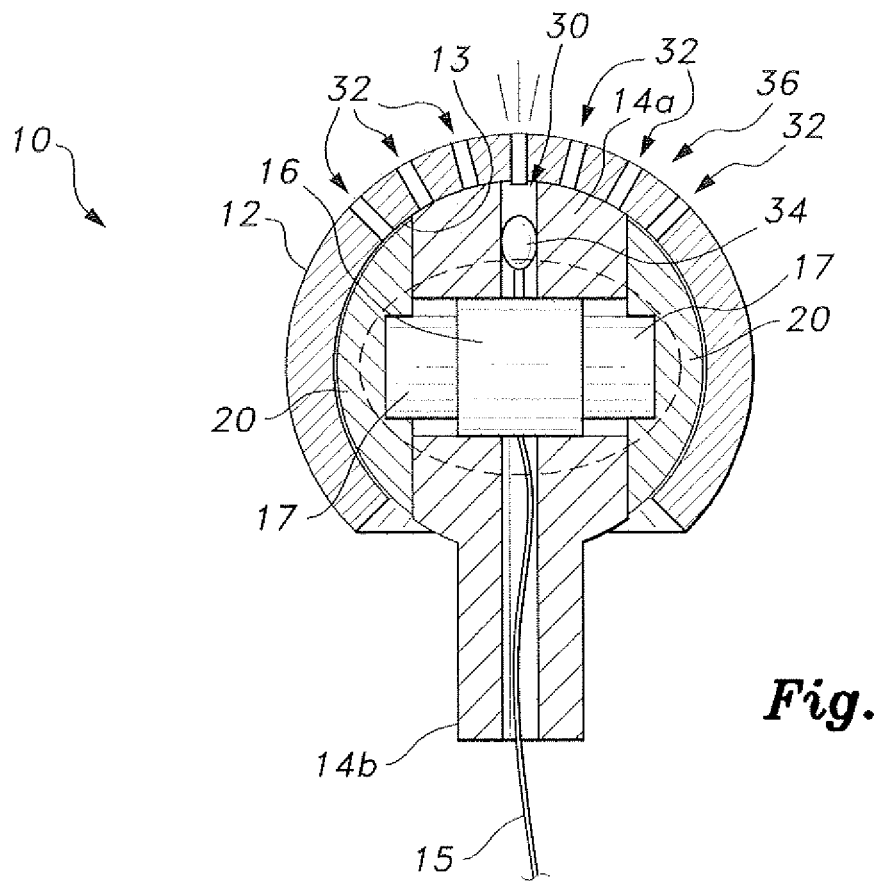
FIG. 4A is a side view in section of an alternative embodiment of a spherical joint with internal brake according to the present invention.
Figure 4B:
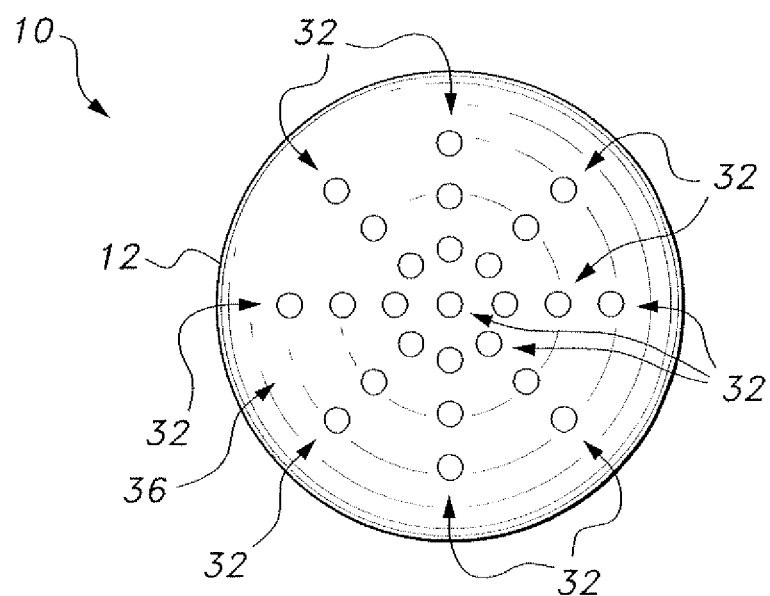
FIG. 4B is a top view of the spherical joint with internal brake of FIG. 4A.

In addition to limitations placed on the range of motion by the shape and dimensions of the joint, a visual indicator of position of the internal spherical components with respect to the shell 12 may further be provided. In the alternative embodiment of FIG. 4A, a central, radially extending channel 30 is formed in the central spherical section 14a, the channel 30 having an open upper end adjacent the inner wall 13 of the shell 12. Apertures 32 are formed through the upper portion 36 of the shell 12 so that light emitted by a light emitting diode 34, for example, will pass through a particular aperture 32 when the channel 30 is aligned therewith. In the top view of FIG. 4B, an exemplary arrangement of apertures 32 is shown, the apertures 32 being arrayed in concentric circles about the center of the upper portion 36 of the shell 12. The position of the internal portions of the brake may be externally detected by visual inspection of the light shining through the apertures 32. A user may view this by eye, or an automatic system using photosensors or the like may be utilized. Positioning of the internal portions of the brake 10 may then be varied or corrected with respect to the outer shell 12, braking and release control commands being delivered via control line 15 and sent by proportional-integral-derivative (PID) controller 40 or the like.

In a passive motion, the sphere can rotate to a desired position at which the piezoelectric/solenoid actuator 16 is activated, forcing the two opposite portions 20 to move outwardly to lock the joint at the desired position in a smooth manner. Preferably, the contact area between the internal portions of the brake 10 and the inner wall 13 of the shell 12 have a surface roughness greater than 30 μm to ensure efficient braking through friction. Preferably, the actuator 16 only displaces the first and second internal spherical sectioned members 20 less than 0.5 mm during braking; i.e., the internal portions of the brake 10 almost contact the inner wall 13 when in the freely rotating condition.

Figure 7:
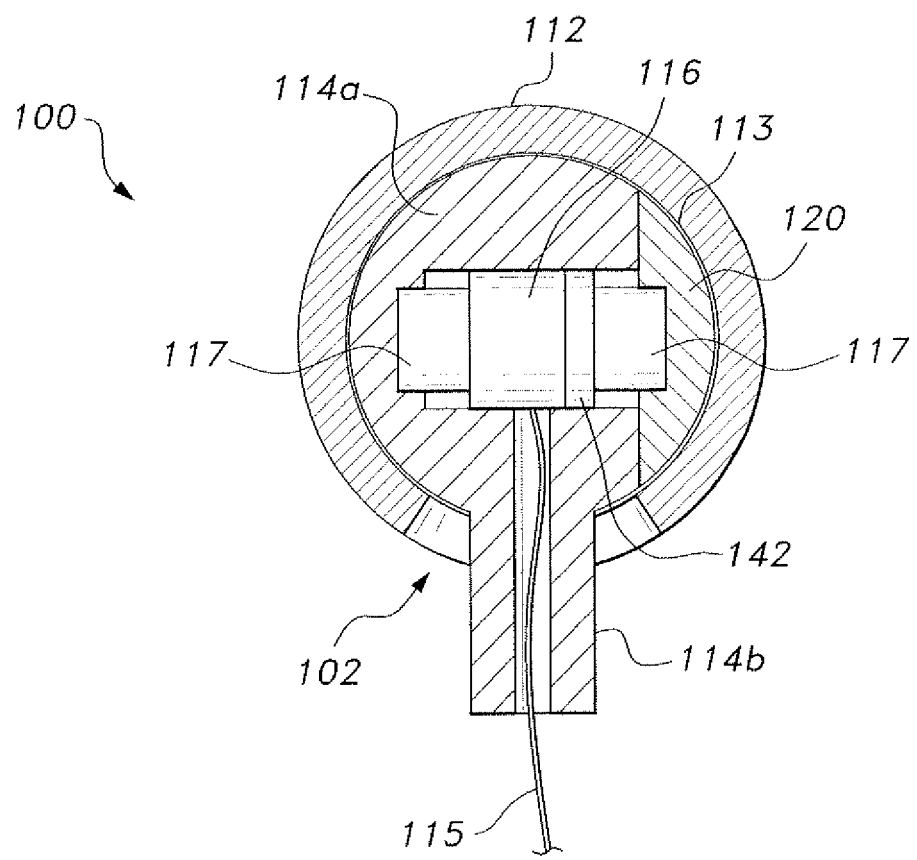
FIG. 7 is a side view in section of yet another alternative embodiment of a spherical joint with internal brake according to the present invention.

In the alternative embodiment of FIG. 7, the brake 100 operates in a similar manner to the brake 10 described above. However, only two internal portions are provided for contacting the inner wall 113 of the outer shell 112. First and second internal spherical sectioned members 114a, 120, respectively, are asymmetrically configured and dimensioned so that a second spherical sectioned member 120 forms a section of a sphere smaller than half an internal spherical volume of the outer spherical retaining shell 113. In other words, the first internal sectioned member 114a and the second internal sectioned member 120 fill the entirety of the inner volume of the shell 112, the first internal sectioned member 114a filling more than half of the substantially spherical volume. Thus, equivalents of portions 14a, 14b of brake 100 are integral in the large sectioned member 114a.

Similar to brake 10, an actuator 116 coupled with a force sensor 142 receives control signals via line 115 to actuate dual pistons 117, which push against the first and second internal spherical sectioned members 114a, 120 in a manner similar to that described above with regard to the previous embodiments. The lower portion of the first internal sectioned member 114a forms a shaft 114b, which projects through an aperture 102, formed in the lower portion of the shell 112.

It is to be understood that the present invention is not limited to the embodiment described above, but encompasses any and all embodiments within the scope of the following claims.

I claim:

1. A spherical joint with internal brake, comprising:
   an outer spherical retaining shell having an outer wall and an internal wall, the retaining shell defining an aperture and a plurality of holes;
   first and second internal spherical sectioned members disposed inside the outer retaining shell, the sectioned members being in contact with the internal wall of the outer retaining shell;
   an actuator having a dual piston, the piston having opposed external ends, the external ends of the dual piston being attached to the first and second internal spherical sectioned members, respectively;
   third and fourth internal spherical sectioned members attached to the actuator, the fourth internal spherical sectioned member having a radially extending channel formed therein, the channel having an open end;
   an elongate member attached to the third internal spherical sectioned member, the elongate member extending through the shell aperture;
   a control line operably connected to the actuator, the control line being adapted for relaying braking and release commands from a controller, the actuator responsively varying friction between the first and second spherical sections and the internal wall of the spherical retaining shell, thereby selectively braking and alternately allowing rotational motion of the internal spherical sections and the elongate member relative to the outer spherical retaining shell; and
   a light source mounted within the radially extending channel formed in the fourth internal spherical sectioned member, whereby light produced by the light source and passing through the open end of the channel and one of the holes in the outer shell when aligned therewith provides an external visual indication of a position of the fourth internal spherical sectioned member with respect to the outer retaining shell.

2. The spherical joint according to claim 1, further comprising means for positioning the internal spherical sectioned members and the extending elongate member at any position within a predetermined range of rotational motion with respect to the outer retaining shell.

3. The spherical joint according to claim 2, wherein the means for positioning comprises:
   means for selective locking the internal spherical section members and the extending elongate member in position; and
   a PID controller operatively connected to said control line.

4. The spherical joint according to claim 3, further comprising a force sensor coupled to said external PID controller.

5. The spherical joint with internal brake according to claim 2, further comprising means for accepting actuator force magnitude commands from an internal controller and an internal force sensor operably connected to the joint.

6. The spherical joint with internal brake according to claim 1, wherein the actuator is an actuator selected from the group consisting of a piezoelectric actuator, an electromagnetic actuator, and a pneumatic actuator.

7. The spherical joint with internal brake according to claim 1, wherein an interface between the first and second internal spherical sectioned members and the internal wall of the outer retaining shell has a surface roughness of at least 30 µm.

8. A spherical joint with internal brake, comprising:
   an outer spherical retaining shell having an outer wall and an internal wall, the retaining shell defining an aperture;
   first and second internal spherical sectioned members disposed inside the outer shell, the sectioned members being in contact with the internal wall of the outer retaining shell and forming an interface between the first and second internal spherical sectioned members and the internal wall of the outer retaining shell having a surface roughness of at least 30 µm;
   an actuator having a dual piston, the piston having opposed external ends, the external ends of the dual piston being attached to the first and second internal spherical sectioned members, respectively;
   an elongate member attached to the actuator and extending through the shell aperture;
   a control line operably connected to the actuator; and
   a controller connected to the control line, the controller being configured to selectively send braking and release commands to the actuator, the actuator being configured to responsively vary friction between the first and second spherical sections and the internal wall of the spherical retaining shell, thereby braking and alternately allowing rotational motion of the internal spherical sections and elongate member relative to the outer spherical retaining shell.

9. The spherical joint with internal brake according to claim 8, further comprising means for positioning the internal spherical sectioned members and extending the elongate member at any position within a predetermined range of rotational motion positions with respect to the outer retaining shell.

10. The spherical joint with internal brake according to claim 9, wherein the positioning means comprises said controller and a force sensor, said controller being an external PID controller.

11. The spherical joint with internal brake according to claim 9, wherein the positioning means comprises said controller and a force sensor connected to said actuator, said controller being an internal PID controller.

12. The spherical joint with internal brake according to claim 9, wherein said controller is external to said joint, the spherical joint further comprising means for accepting actuator force magnitude commands from said controller.

13. The spherical joint with internal brake according to claim 9, wherein said controller is internal to said joint, the spherical joint further comprising means for accepting actuator force magnitude commands from said controller.

14. The spherical joint with internal brake according to claim 9, further comprising means for accepting actuator force magnitude commands from said controller, said controller being internally disposed in the joint.

15. The spherical joint with internal brake according to claim 8, wherein the actuator is an actuator selected from the group consisting of a piezoelectric actuator, an electromagnetic actuator, and a pneumatic actuator.

16. The spherical joint with internal brake according to claim 8, wherein the first and second internal spherical sectioned members are asymmetrically configured and dimensioned so that one of said first and second spherical sectioned members forms a section of a sphere smaller than half an internal spherical volume of said outer spherical retaining shell.

17. The spherical joint with internal brake according to claim 8, wherein said actuator displaces said first and second internal spherical sectioned members less than 0.5 mm.

18. A spherical joint with internal brake, comprising:
   an outer spherical retaining shell having an outer wall and an internal wall, the retaining shell defining an aperture;
   first and second internal spherical sectioned members disposed inside the outer shell, the sectioned members being in contact with the internal wall of the outer retaining shell, the first and second internal spherical sectioned members being asymmetrically configured and dimensioned so that one of said first and second spherical sectioned members forms a section of a sphere smaller than half an internal spherical volume of said outer spherical retaining shell;
   an actuator having a dual piston, the piston having opposed external ends, the external ends of the dual piston being attached to the first and second internal spherical sectioned members, respectively;
   an elongate member attached to the actuator and extending through the shell aperture; and
   a control line operably connected to the actuator, the control line being adapted for relaying braking and release commands from a controller, the actuator responsively varying friction between the first and second spherical sections and the internal wall of the spherical retaining shell, thereby braking and alternately allowing rotational motion of the internal spherical sections and elongate member relative to the outer spherical retaining shell.

19. The spherical joint with internal brake according to claim 18, wherein the first and second internal spherical sectioned members and the internal wall of the outer retaining shell define an interface therebetween having a surface roughness of at least 30 µm.

20. The spherical joint with internal brake according to claim 18, wherein said actuator displaces said first and second internal spherical sectioned members less than 0.5 mm.

\* \* \* \* \*